United States Patent
Gu et al.

(10) Patent No.: US 9,738,174 B2
(45) Date of Patent: Aug. 22, 2017

(54) MULTIPLE BATTERY PACK AND OPERATING METHOD THEREOF

(71) Applicant: SAMSUNG SDI CO., LTD., Yongin-si, Gyeonggi-do (KR)

(72) Inventors: Jae-Sung Gu, Yongin-si (KR); Eui-Hwan Song, Yongin-si (KR); Ji-Hong Lim, Yongin-si (KR); Seok-Gyun Woo, Yongin-si (KR); Woon-Sun Rheu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 621 days.

(21) Appl. No.: 14/218,837

(22) Filed: Mar. 18, 2014

(65) Prior Publication Data
US 2014/0312687 A1 Oct. 23, 2014

(30) Foreign Application Priority Data
Apr. 19, 2013 (KR) .................. 10-2013-0043753

(51) Int. Cl.
*B60L 11/18* (2006.01)
*H01M 4/58* (2010.01)
(Continued)

(52) U.S. Cl.
CPC ........... *B60L 11/1868* (2013.01); *B60L 11/14* (2013.01); *B60L 11/1861* (2013.01);
(Continued)

(58) Field of Classification Search
CPC ........ H01M 4/02; B60L 11/14; Y02T 10/7077
(Continued)

(56) References Cited

U.S. PATENT DOCUMENTS

| 5,949,157 A * | 9/1999 | Hirzel ...................... H01H 3/26 307/112 |
| 2011/0001352 A1* | 1/2011 | Tamura ................. B60R 16/033 307/9.1 |

(Continued)

FOREIGN PATENT DOCUMENTS

| CN | 101944756 A | 1/2011 |
| CN | 102403497 A | 4/2012 |

(Continued)

OTHER PUBLICATIONS

EPO Search Report dated Sep. 10, 2014, for corresponding European Patent application 14161093.1, (9 pages).

(Continued)

*Primary Examiner* — Robert Deberadinis
(74) *Attorney, Agent, or Firm* — Lewis Roca Rothgerber Christie LLP (57) ABSTRACT

A lithium battery system includes a first battery pack including a plurality of first battery cells connected in series. The first battery pack is configured to be connected in parallel to an alternator and a second battery pack, and has a lower capacity than the second battery pack. A negative electrode of each of the first battery cells includes a negative electrode active material. The negative electrode active material includes a carbon-based material having an interlayer spacing of a (002) plane of 0.34 nm to 0.50 nm in X-ray diffraction measurement using copper (Cu) Kα lines.

19 Claims, 8 Drawing Sheets

(51) Int. Cl.
*H01M 4/587* (2010.01)
*H01M 10/0525* (2010.01)
*H01M 16/00* (2006.01)
*B60L 11/14* (2006.01)
*H01M 4/02* (2006.01)
*H01M 10/06* (2006.01)
*H01M 10/44* (2006.01)
*H02J 7/00* (2006.01)
*H02J 7/14* (2006.01)

(52) U.S. Cl.
CPC ......... *B60L 11/1864* (2013.01); *H01M 4/587* (2013.01); *H01M 4/5825* (2013.01); *H01M 10/0525* (2013.01); *H01M 16/00* (2013.01); *B60L 2240/547* (2013.01); *B60L 2240/549* (2013.01); *B60L 2240/662* (2013.01); *H01M 10/06* (2013.01); *H01M 10/441* (2013.01); *H01M 2220/20* (2013.01); *H02J 7/0013* (2013.01); *H02J 7/1423* (2013.01); *Y02E 60/122* (2013.01); *Y02E 60/126* (2013.01); *Y02T 10/70* (2013.01); *Y02T 10/7005* (2013.01); *Y02T 10/7011* (2013.01); *Y02T 10/7016* (2013.01); *Y02T 10/7044* (2013.01); *Y02T 10/7061* (2013.01); *Y02T 10/7066* (2013.01); *Y02T 10/7077* (2013.01); *Y02T 10/7291* (2013.01); *Y02T 90/16* (2013.01)

(58) Field of Classification Search
USPC .......................................................... 307/150
See application file for complete search history.

(56) References Cited

U.S. PATENT DOCUMENTS

| 2011/0064977 | A1 | 3/2011 | Wendel et al. |
| 2012/0070745 | A1* | 3/2012 | Ishida ............... H01M 4/38 429/231.8 |
| 2012/0321960 | A1 | 12/2012 | Kim et al. |

FOREIGN PATENT DOCUMENTS

| DE | 10 2011 054 158 A1 | 4/2012 |
| EP | 2 538 484 A1 | 12/2012 |
| JP | 4258731 | 2/2009 |
| JP | 2011-521399 | 7/2011 |
| JP | 2012-080706 | 4/2012 |
| JP | 2013-4519 | 1/2013 |
| KR | 10-2008-0025975 | 3/2008 |
| KR | 10-2010-0124684 | 11/2010 |
| KR | 10-1138522 | 4/2012 |

OTHER PUBLICATIONS

English machine translation of Japanese Publication No. JP 2006-067644, dated Mar. 9, 2006, for JP 4258731, 17 pages.

KIPO Office action dated Feb. 2, 2016, for Korean priority Patent application 10-2013-0043753, (7 pages).

English machine translation of Japanese Publication 2012-080706 dated Apr. 19, 2012, (23 pages).

SIPO Office Action dated Jun. 30, 2017, for corresponding Chinese Patent Application No. 201410150261.1 (7 pages).

* cited by examiner

MULTIPLE BATTERY PACK AND OPERATING METHOD THEREOF

CROSS-REFERENCE TO RELATED APPLICATION

This application claims priority to and the benefit of Korean Patent Application No. 10-2013-0043753, filed in the Korean Intellectual Property Office on Apr. 19, 2013, the entire content of which is incorporated herein by reference.

BACKGROUND

1. Field

Aspects of embodiments of the present invention relate to a multiple battery pack and a method of operating the multiple battery pack.

2. Description of the Related Art

A vehicle including a dual battery pack may supply power to a lithium-ion battery pack using a power conversion device including a switch in a regenerative braking stage. One battery pack of the dual battery pack may be a lithium-ion battery pack and the other may be a lead-acid battery pack. Power generated in the regenerative braking stage and a part of the power generated by an alternator may be stored in one battery pack of the dual battery pack. In this case, the vehicle may supply power to the lithium-ion battery pack or the lead-acid battery pack using the power conversion device including the switch. When the lithium-ion battery pack is charged and a state of charge (SOC) of the lithium-ion battery pack is higher than a set or predetermined level, the switch of the power conversion device is turned off, and the lithium-ion battery pack is connected to an electric load to supply power thereto.

As described, when the switch is used for power supply, a switching loss may occur and fuel efficiency improvement of the vehicle may deteriorate. In addition, the lithium-ion battery pack may have a limited operation voltage range, and the limited operation voltage range may block regenerative charging. That is, the switch may be forcibly turned off. This may cause damage to the switch, and accordingly power loss and heat generation may occur. Further, since the switch operation cannot be controlled while the vehicle is parked, energy stored in the lithium-ion battery pack cannot be used.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention provide for a vehicle battery system having a multiple battery pack and a method for operating the vehicle battery system. Further aspects of embodiments of the present invention provide for a vehicle battery system having a multiple battery pack including at least two battery packs connected in parallel without having a power conversion device that includes a switch, and an operation method of the vehicle battery system.

According to an embodiment of the present invention, a lithium battery system is provided. The lithium battery system includes a first battery pack including a plurality of first battery cells connected in series. The first battery pack is configured to be connected in parallel to an alternator and a second battery pack, and has a lower capacity than the second battery pack. A negative electrode of each of the first battery cells includes a negative electrode active material. The negative electrode active material includes a carbon-based material having an interlayer spacing of a (002) plane of 0.34 nm to 0.50 nm in X-ray diffraction measurement using copper (Cu) Kα lines.

The carbon-based material may be amorphous carbon.

The carbon-based material may be soft carbon, hard carbon, mesophase pitch-based carbide, calcined cokes, or a combination thereof.

An average diameter of the carbon-based material may be 1 μm to 50 μm.

Each of the first battery cells may include a positive electrode. The positive electrode may include a positive electrode active material. The positive electrode active material may include a lithium-nickel-based oxide, a lithium-cobalt-based oxide, a lithium-nickel-manganese-based oxide, a lithium-nickel-cobalt-manganese-based oxide, a lithium-nickel-cobalt-aluminum-based oxide, a lithium-phosphate-based oxide, or a combination thereof.

The positive electrode active material may further include a carbon material having a surface area of 500 m²/g to 2500 m²/g.

Each of the first battery cells may be a lithium-ion cell. A positive electrode of each of the first battery cells may include a nickel-based positive electrode active material.

An operation voltage range of each of the first battery cells may include a first enhanced range including 1.5 V to 2.0 V, a first normal range including 2.0 V to 4.2 V, and a first over-charging range including 4.2 V to 4.5 V.

Each of the first battery cells may be a lithium-ion battery cell. A positive electrode of each of the first battery cells may include a lithium-iron-phosphate-based positive electrode active material.

An operation voltage range of each of the first battery cells may include a second normal range including 1.75 V to 3.8 V, and a second over-charging range including 3.8 V to 4.5 V.

A current path between the first battery pack and the alternator may be shorter than a current path between the second battery pack and the alternator.

Internal resistance of the first battery pack may be lower than internal resistance of the second battery pack.

According to another embodiment of the present invention, a vehicle battery system is provided. The vehicle battery system includes an alternator configured to generate power to the vehicle battery system, a first battery pack connected in parallel with the alternator and including a plurality of first battery cells connected in series, and a second battery pack connected with the alternator and the first battery pack in parallel, and having a capacity greater than that of the first battery pack. A negative electrode of each of the first battery cells includes a negative electrode active material. The negative electrode active material includes a carbon-based material having an interlayer spacing of a (002) plane of 0.34 nm to 0.50 nm in X-ray diffraction measurement using copper (Cu) Kα lines.

The second battery pack may be a lead-acid battery pack.

A current path between the first battery pack and the alternator may be shorter than a current path between the second battery pack and the alternator.

Internal resistance of the first battery pack may be lower than internal resistance of the second battery pack.

According to yet another embodiment of the present invention, an operation method of a vehicle battery system having a multiple battery pack that is coupled in parallel with an alternator, a starter, and a load of a vehicle is provided. The method includes supplying power to the starter from the multiple battery pack during a cranking operation of the vehicle, supplying power to the load from one of the alternator or the multiple battery pack when the vehicle is being driven, and supplying power to the vehicle from the multiple battery pack when the vehicle is parked. The multiple battery pack includes a first battery pack and a second battery pack. The first battery pack includes a plurality of first battery cells connected in series. A negative electrode of each of the first battery cells includes a negative electrode active material. The negative electrode active material includes a carbon-based material having an interlayer spacing of a (002) plane of 0.34 nm to 0.50 nm in X-ray diffraction measurement using copper (Cu) Kα lines.

The supplying of the power to the load when the vehicle is being driven may include supplying output power of the alternator to the load when the output power of the alternator is higher than a reference power, and supplying power from the multiple battery pack to the load when the output power of the alternator is lower than the reference power.

The method may further include charging the multiple battery pack with excess power from the alternator when output power of the alternator is higher than a reference power.

When the multiple battery pack is being charged with the excess power from the alternator, a charging speed of the first battery pack may be faster than a charging speed of the second battery pack.

When the multiple battery pack is supplying the power to the vehicle when the vehicle is parked, a discharging speed of the first battery pack may be faster than a discharging speed of the second battery pack.

Other details of embodiments of the present invention are included in the detailed description. A multiple battery pack according to an embodiment of the present invention can be charged by an alternator and supply power to a load without having additional power conversion members or power control members. The operation voltage range of the lithium-ion battery cell according to an embodiment of the present invention may cover the entire voltage ranges generated from a vehicle.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through one or more third elements. In addition, unless explicitly described to the contrary, the word "comprise" and variations such as "comprises" or "comprising" will be understood to imply the inclusion of stated elements but not the exclusion of any other elements.

Herein, the use of the term "may," when describing embodiments of the present invention, refers to "one or more embodiments of the present invention." In addition, the use of alternative language, such as "or," when describing embodiments of the present invention, refers to "one or more embodiments of the present invention" for each corresponding item listed. Hereinafter, battery packs according to embodiments of the present invention will be described with reference to the accompanying drawings.

Figure 1:
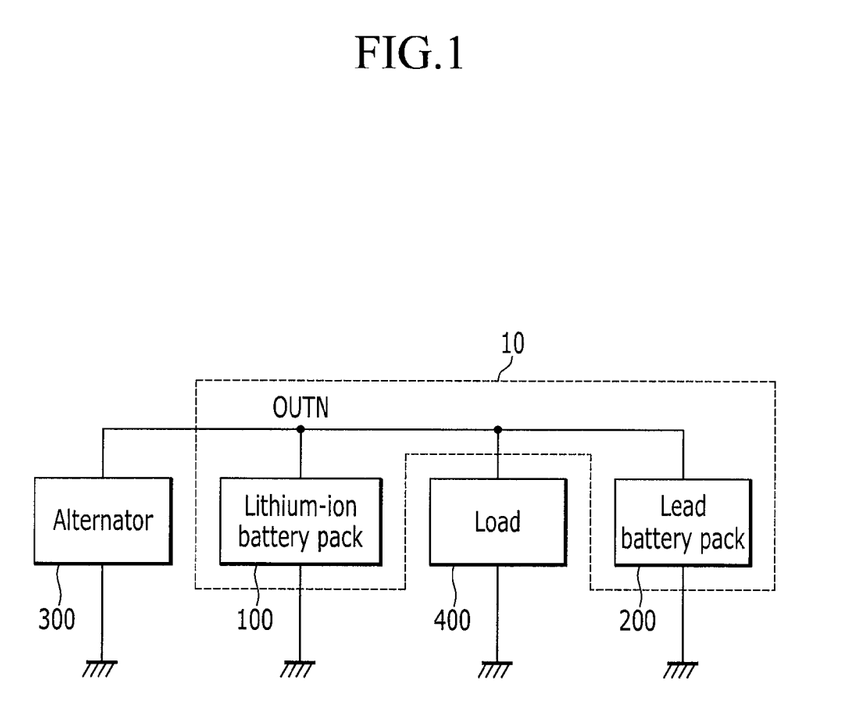
FIG. 1 is a block diagram of a vehicle battery system provided with a multiple battery pack according to an embodiment of the present invention.

FIG. 1 is a block diagram of a vehicle battery system provided with a multiple battery pack 10 according to an embodiment of the present invention.

In FIG. 1, the multiple battery pack 10 includes a lithium-ion battery pack 100 and a lead-acid battery pack 200. The lithium-ion battery pack 100 and the lead-acid battery pack 200 are connected in parallel with a load 400 and an alternator 300, and the lithium-ion battery pack 100, the lead-acid battery pack 200, the load 400, and the alternator 300 are connected in parallel with each other. FIG. 1 illustrates a single lithium-ion battery pack 100 and a single lead-acid battery pack 200, but the present invention is not limited thereto. In other embodiments, the multiple battery pack 10 may include at least one lithium-ion battery pack and at least one lead-acid battery pack.

The alternator 300 generates power and supplies the power to the load 400 or charges the multiple battery pack 10. The load 400 includes various suitable loads provided in a vehicle. As an electric load, the load 400 draws power from at least one of the alternator 300 or the multiple battery pack 10.

For example, the lead-acid battery pack 200 may have a capacity of 60-100 Ah and the lithium-ion battery pack 100 may have a capacity of 4-20 Ah. Since internal resistance of the lithium-ion battery pack 100 is significantly lower compared to the lead-acid battery pack 200, initial power required for the load 400 is supplied from the lithium-ion battery pack 100. However, when the load 400 continuously consumes power, power may be supplied from the lead-acid battery pack 200.

As shown in FIG. 1, the multiple battery pack 10, the alternator 300, and the load 400 are connected in parallel between an output node OUTN and ground. The lithium-ion battery pack 100 includes a plurality of lithium-ion battery cells coupled in series, and each of the lithium-ion battery cells includes a negative electrode formed of amorphous carbon, preferably a low-crystalline carbon, and a positive electrode formed of a nickel (Ni)-based material or lithium iron phosphate (LFP)-based material.

Figure 2:
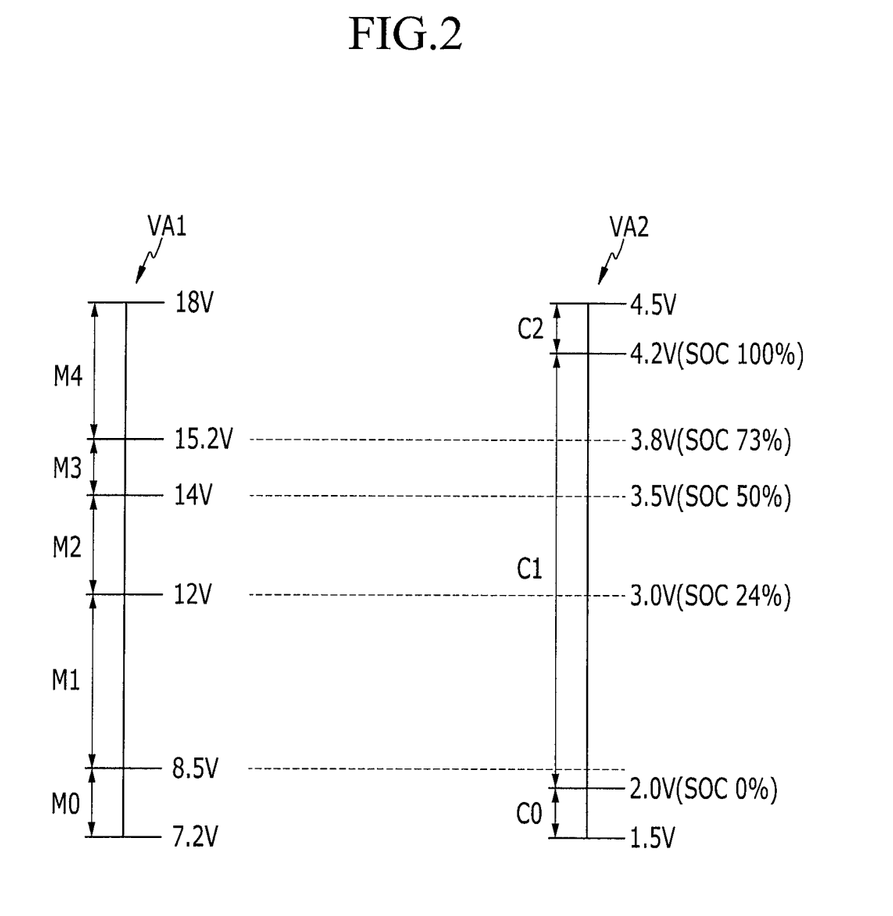
FIG. 2 shows a voltage range generated in a vehicle and an operation voltage range of a nickel-based positive electrode lithium-ion battery cell according to an embodiment of the present invention.

FIG. 2 shows a voltage range generated in a vehicle and an operation voltage range of a nickel-based positive electrode lithium-ion battery cell according to an embodiment of the present invention.

The operation voltage range shown in FIG. 2 is an operation voltage range of a lithium-ion battery cell using a negative electrode formed of amorphous carbon and a nickel-based positive electrode. Hereinafter, the voltage range generated in the vehicle is referred to as VA1, and the operation voltage range of the lithium-ion battery cell using the nickel-based positive electrode is referred to as VA2.

In further detail, VA1 includes five conditions, and the entire range from 7.2 V (volts) to 18 V is classified depending on the five conditions. First, a cold cranking range M0 is from 7.2 V to 8.5 V, and is a voltage range generated when an engine is started from a cold temperature. A cranking range M1 is from 8.5 V to 12 V, and is a voltage range generated once the engine starts.

A normal voltage range M2 is from 12 V to 14 V, and is a voltage range generated in a normal condition when no additional charging is occurring, such as when the multiple battery pack 10 is not being charged by the alternator. By contrast, a charging voltage range M3 is from 14 V to 15.2 V, and is a voltage range generated during a charging condition, such as when the multiple battery pack 10 is being charged by the alternator 300. In addition, an over-voltage range M4 is from 15.2 V to 18 V, and is a voltage range generated in an abnormal condition, such as when the alternator 300 or a regulator malfunctions.

In comparison, VA2 includes three conditions, and the entire range from 1.5 V to 4.5 V (for a single cell), or 6.0 V to 18 V (for a four-cell battery pack) is classified depending on the three conditions. An enhanced range C0 is from 1.5 V to 2.0 V, and is a range whose use is restricted to between several seconds and several minutes for cranking of a vehicle engine from a cold temperature. A normal range C1 is from 2.0 V to 4.2 V, and is a range from SOC 0% to SOC 100%. An overcharge range C2 is from 4.2 V to 4.5 V, and is a range exceeding SOC 100%.

In FIG. 2, each range of VA1 corresponds to a portion of VA2. In FIG. 2, VA1 and VA2 correspond to each other when the lithium-ion battery pack 100 is formed of four lithium-ion battery cells connected in series. Accordingly, when the lithium-ion battery pack 100 is formed of four cells connected in series, dividing each voltage of VA1 by 4 yields a corresponding voltage of a single lithium-ion battery cell.

As such, the cold cranking range M0 corresponds to the enhanced range C0 and a lower part of the normal range C1; the cranking range M1, the normal voltage range M2, and the charging voltage range M3 correspond to the normal voltage range C1; and the over-voltage range M4 corresponds to an upper part of the normal range C1 and the over-charging range C2. That is, the entire ranges M0 to M4 of the voltage generated from the vehicle are covered by the operation voltage ranges C0 to C2 of the nickel-based positive electrode lithium-ion battery cell.

Figure 3:
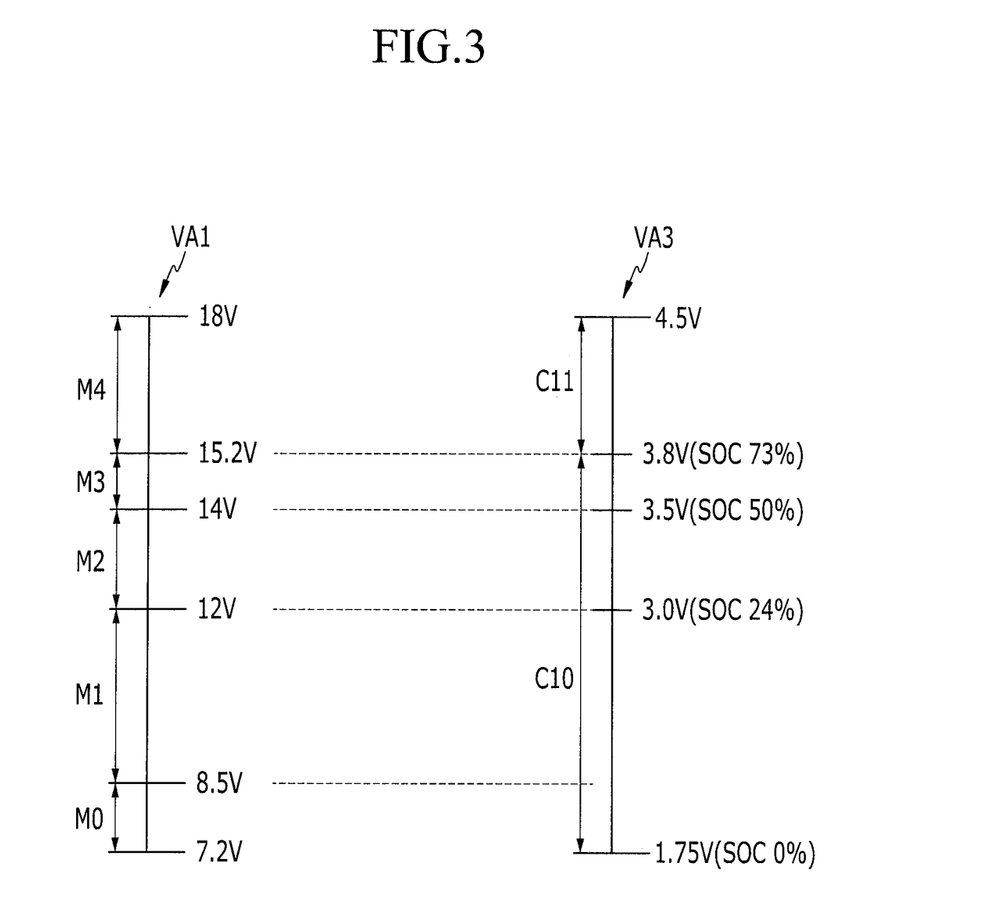
FIG. 3 shows a voltage range generated in a vehicle and an operation voltage range of a lithium iron phosphate (LFP)-based positive electrode lithium-ion battery cell according to an embodiment of the present invention.

FIG. 3 shows a voltage range generated in a vehicle and an operation voltage range of an LFP-based lithium-ion battery cell according to an embodiment of the present invention.

In FIG. 3, the operation voltage range is an operation voltage range of a lithium-ion battery cell using a negative electrode formed of amorphous carbon and an LFP-based positive electrode. The operation voltage range of the lithium-ion battery cell shown in FIG. 3 is also a voltage range when the lithium-ion battery cell is formed of four lithium-ion battery cells connected in series (by multiplying the corresponding voltages in VA3 by four, which produces a range from 7.0 V to 18 V). Since VA1 is the same as in FIG. 2, an operation voltage range VA3 of the lithium-ion battery cell using the LFP-based positive electrode and correspondence between VA1 and VA3 will be described.

VA3 includes two conditions, and the entire range from 1.75 V to 4.5 V is classified depending on the two conditions. A normal range C10 is from 1.75 V to 3.8 V, and is a range from SOC 0% to SOC 100%. An overcharge range C11 is from 3.8 V to 4.5 V, and is a range exceeding SOC 100%.

In FIG. 3, each range of VA1 corresponds to a portion of VA3. The VA1 and the VA3 shown in FIG. 3 correspond to each other when four such lithium-ion battery cells are connected in series. Accordingly, when the lithium-ion battery pack 100 is formed of four cells connected in series, dividing the respective voltages of VA1 by 4 yields a corresponding voltage of one lithium-ion battery cell.

As such, the cold cranking range M0, the cranking range M1, the normal voltage range M2, and the charging voltage range M3 correspond to the normal range C10, while the over-voltage range M4 corresponds to the overcharge range C11. That is, the entire ranges M0 to M4 of the voltages generated from the vehicle are covered by the operation voltage ranges C10 to C11 of the LFP-based positive electrode lithium-ion battery cell.

The voltage range generated from the vehicle and the voltage range of the lithium-ion battery cells, described with reference to FIG. 2 and FIG. 3, are examples provided for description of embodiments of the present invention, but the present invention is not limited thereto. When amorphous carbon is used for the negative electrode of the lithium-ion battery cell, an enhanced range may be decreased below 2.0 V. Accordingly, a voltage of the cold cranking range is supplied by such a lithium-ion battery cell. On the other hand, it is difficult to decrease an enhanced range of a battery cell including a negative electrode formed by using graphite to be lower than 2.0 V. Therefore, the battery cell including the negative electrode using graphite cannot supply a voltage of the cranking range.

As described, the operation voltage range of the lithium-ion battery cell according to embodiments of the present invention can cover the entire voltage ranges generated from the vehicle. The operation voltage characteristics of such lithium-ion battery cells may be set as described with reference to FIG. 2 and FIG. 3 by manufacturing the negative electrode of the lithium-ion battery cell using amorphous carbon.

Hereinafter, the structure of the lithium-ion battery cell according to an embodiment of the present invention will be described in further detail with reference to FIG. 4.

Figure 4:
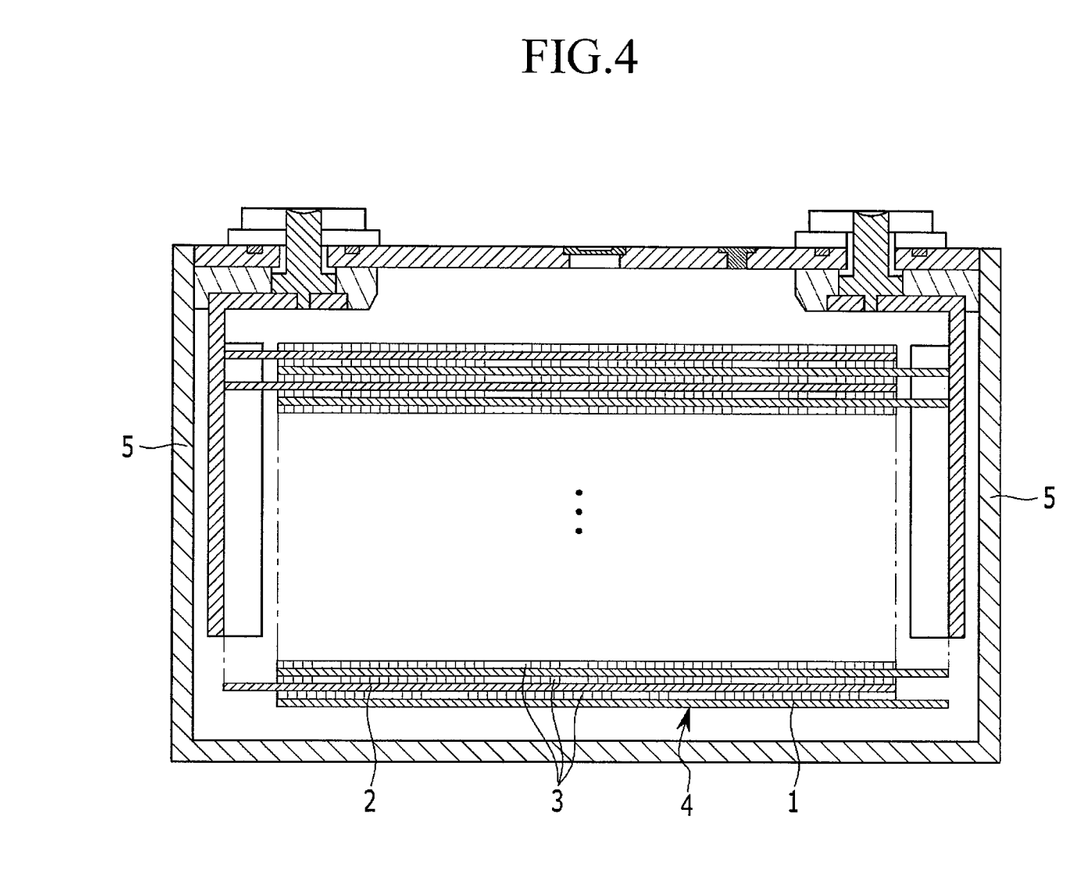
FIG. 4 is a cutaway view of a lithium-ion secondary battery cell according to an embodiment of the present invention.

FIG. 4 is a cutaway view of the lithium-ion battery cell. The lithium-ion battery cell is formed in the shape of a prism for illustrative purposes, but the present invention is not limited thereto. Embodiments of the present invention may be applied to various suitable shapes of batteries such as a lithium polymer battery, a cylindrical battery, or the like.

Referring to FIG. 4, the lithium-ion battery may include an electrode assembly 4 formed by spirally winding a positive electrode 1 and a negative electrode 2, interposing a separator 3 therebetween, and a case 5 in which the electrode assembly 4 is installed. The positive electrode 1, the negative electrode 2, and the separator 3 may be impregnated in an electrolyte solution.

The negative electrode 2 includes a current collector and a negative electrode active material layer formed on the current collector. The negative electrode active material layer includes a negative electrode active material. The negative electrode active material includes a material that can reversibly perform intercalation/deintercalation on lithium ions. In further detail, the negative electrode active material includes a carbon-based material of which interlayer spacing ($d_{002}$) of a (002) plane is 0.34 nm to 0.50 nm in X-ray diffraction measurement using Cu (copper) Kα lines. The term "002" relates to Miller indices known in the art.

The interlayer spacing $d_{002}$ may be 0.34 nm to 0.45 nm, 0.34 nm to 0.40 nm, 0.34 nm to 0.37 nm, or 0.34 nm to 0.36 nm. In one embodiment, when the interlayer spacing satisfies one of these ranges, lithium ions can be inserted and separated with ease, thereby realizing excellent high-rate charging/discharging characteristics. On the contrary, in case of graphite having an interlayer spacing $d_{002}$ of less than about 0.34 nm, lithium ions cannot be easily inserted or separated so that the high-rate charging/discharging characteristics are deteriorated.

The carbon-based material may be an amorphous carbon. Unlike graphite, amorphous carbon does not have a limited number of insertions and separation paths for lithium ions, and electrode expansion is not easy. Accordingly, high-output characteristics and long life spans can be realized using amorphous carbon. In particular, amorphous carbon may have high reversible capacity in heat treatment at lower than 800° C. Examples of amorphous carbon may include soft carbon, hard carbon, mesophase pitch-based carbide, and calcined cokes.

For example, the carbon-based material may be soft carbon. As a graphitizing carbon, soft carbon can undergo automatic arrangement and be easily formed into a layered structure so that the soft carbon can be easily changed to a graphite structure according to an increase of a heat treatment temperature. Since soft carbon has disordered crystals compared to graphite, soft carbon includes many gates that help entry and exit of lithium ions, and ions can be easily dispersed since the disordered crystals are more numerous compared to hard carbon. As a more detailed example, the carbon-based material may be a soft carbon having low crystallinity.

An average diameter D50 of the carbon-based material may be 1 μm to 50 μm. In further detail, the average diameter D50 may be 1 to 40 μm, 1 to 30 μm, 1 to 20 μm, 5 to 50 μm, 10 to 50 μm, 5 to 15 μm, or 6 to 12 μm. In this case, a suitable amount of pores exists in a negative electrode composition and accordingly, activation sites that function as paths or storage for lithium ions, and that connect crystalline portions, are generated in substantial numbers so that fast storing characteristics and cold temperature high-output characteristics can be achieved and contact resistance can be reduced. Here, D50 refers to a particle size at a volume ratio of 50% in a cumulative size-distribution curve (such as a median particle size).

The carbon-based material may be formed in various suitable shapes such as a sphere, a plate, a flake, a fiber, or the like. For example, the carbon may be formed in the shape of a needle.

The carbon-based material may have a specific surface area of from 0.1 to 20 $m^2/g$, or may be from 0.1 to 10 $m^2/g$, from 1 to 20 $m^2/g$, from 1 to 10 $m^2/g$, or from 1 to 5 $m^2/g$ measured by the BET (Brunauer-Emmett-Teller) method. The carbon-based material having the specific surface area of the above-stated ranges may be used as the negative electrode active material. In this case, a carbon-based material having low crystallinity can be acquired, and accordingly excellent high-rate characteristics and life-span characteristics at high-rate can be achieved.

A tap density of the carbon-based material may be from 0.30 to 10.00 $g/cm^3$, and in further detail, the tap density may be from 0.60 to 10.00 $g/cm^3$, from 0.30 to 5.00 $g/cm^3$, or from 0.60 to 5.00 $g/cm^3$. When the carbon-based material has the tap density of one of the above-stated ranges, a carbon-based material having low crystallinity can be acquired and accordingly, excellent high-rate characteristics and high-rate cycle-life characteristics can be achieved.

The negative active material layer may further include a binder. The binder attaches the negative electrode active material particles to each other and to the current collector. As non-limiting examples, the binder may be one of polyvinyl alcohol, carboxymethyl cellulose, hydroxypropylcellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene butadiene rubber, acrylated styrene-butadiene rubber, an epoxy resin, nylon, or the like.

In addition, the negative electrode active material layer may further include a conductive material. The conductive material is used to provide conductivity to an electrode, and any suitable electronic conductive material that does not cause a chemical change in a battery can be used. For example, a carbon-based material such as natural graphite, artificial graphite, carbon black, acetylene black, ketjen black, carbon fiber, or the like, a metal powder such as copper, nickel, aluminum, silver, or the like, or a metal-based material such as metal fiber or the like, a conductive polymer such as a polyphenylene conductor or the like, or a conductive material including a mixture or combination thereof may be used.

Examples of the current collector include a copper film, a nickel film, a stainless steel film, a titanium film, a nickel film, a copper film, a polymer material coated with a conductive metal, or a combination thereof.

The positive electrode 1 includes a current collector and a positive electrode active material layer formed on the current collector. The positive electrode active material layer includes a positive electrode active material.

As for the positive electrode active material, any suitable compound (lithiated intercalation compound) that can perform reversible intercalation and deintercalation on lithium may be used. In further detail, the positive electrode active material may include a lithium-nickel-based oxide, a lithium-cobalt-based oxide, a lithium-nickel-manganese-based oxide, a lithium-nickel-cobalt-manganese-based oxide, a lithium-nickel-cobalt-aluminum-based oxide, a lithium-phosphate-based oxide, or a combination thereof. For example, the positive electrode active material may be a lithium-nickel-cobalt-manganese-based oxide or a lithium-phosphate-based oxide.

Examples of the positive electrode active material may include one or more of cobalt, manganese, nickel, or a complex oxide of a method of combination thereof, and lithium. In further detail, a compound that can be expressed by one of the following chemical formulas may be used.

$Li_aA_{1-b}R_bD_2$ (here, 0.90≤a≤1.8 and 0≤b≤0.5); $Li_aE_{1-b}R_bO_{2-c}D_c$ (here, 0.90≤a≤1.8, 0≤b≤0.5 and $0 \leq c \leq 0.05$); $LiE_{2-b}R_bO_{4-c}D_c$(here, $0 \leq b \leq 0.5$, $0 \leq c \leq 0.05$); $Li_aNi_{1-b-c}Co_bR_cD_\alpha$ (here, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (here, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (here, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (here, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (here, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (here, $0.90 \leq a \leq 1.8$, $0 \leq b \leq 0.5$, $0 \leq c \leq 0.05$ and $0 < \alpha < 2$); $Li_aNi_bE_cG_dO_2$ (here, $0.90 \leq a \leq 1.8$, $0 \leq b \leq 0.9$, $0 \leq c \leq 0.5$ and $0.001 \leq d \leq 0.1$.); $Li_aNi_bCo_cMn_dGeO_2$(here, $0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ (here, $0.90 \leq a \leq 1.8$ and $0.001 \leq b \leq 0.1$.); $Li_aCoG_bO_2$ (here, $0.90 \leq a \leq 1.8$ and $0.001 \leq b \leq 0.1$.); $Li_aMnG_bO_2$ (here, $0.90 \leq a \leq 1.8$ and $0.001 \leq b \leq 0.1$.); $Li_aMn_2G_bO_4$ (here, $0.90 \leq a \leq 1.8$ and $0.001 \leq b \leq 0.1$.); $QO_2$; $QS_2$, $LiOS_2$; $V_2O_5$; $LiV_2O_5$; $LiTO_2$; $LiNiVO_4$; $Li_{(3-f)}J_2PO_{43}$ ($0 \leq f \leq 2$); $Li_{(3-f)}Fe_2PO_{43}$ ($0 \leq f \leq 2$); and $LiFePO_4$.

In the chemical formulas, A denotes Ni, Co, Mn, or combination thereof; R denotes Al, Ni, Co, Mn, Cr, Fe, Mg, Sr, V, a rare earth element, or combination thereof; D denotes O, F, S, P, or combination thereof; E denotes Co, Mn, or combination thereof; Z denotes F, S, P, or combination thereof; G denotes Al, Cr, Mn, Fe, Mg, La, Ce, Sr, V, or combination thereof, Q denotes Ti, Mo, Mn, or combination thereof, T denotes Cr, V, Fe, Sc, Y, or combination thereof, and J denotes V, Cr, Mn, Co, Ni, Cu, or combination thereof.

A compound having a coating layer on the surface thereof may be used, or the above-stated compound and a compound having a coating layer material may be mixed. The coating layer or coating layer material may be a coating element compound, and may include a coating-element oxide, a coating-element hydroxide, a coating-element oxyhydroxide, a coating-element oxycarbonate, or a coating-element hydroxycarbonade.

A compound forming the coating layers or coating layer materials may be amorphous or crystalline. Example coating elements included in the coating layer or coating layer material may include Mg, Al, Co, K, Na, Ca, Si, Ti, V, Sn, Ge, Ga, B, As, Zr, or a mixture thereof. The coating layer may be formed using any suitable coating method (e.g., spray coating) that does not badly influence a positive electrode active material using the above-stated elements to the compound (e.g., spray coating, dipping, or the like). Since the coating method is well known to a person skilled in the art, no further description will be provided.

The positive electrode active material may further include a carbon material. Particularly, the positive electrode active material may further include a carbon material having a surface area of 500 $m^2/g$ to 2500 $m^2/g$. In this case, a high input-output characteristic of the high-capacity lithium secondary battery can be easily maintained.

The surface area of the carbon material may be 1000 to 2500 $m^2/g$, and in further detail, may be 1200 to 2000 $m^2/g$. When the surface area of the carbon material is included in such a range, an activation site of the positive electrode active material is increased and thus high input output can be simply achieved, and accordingly, excellent high-rate cycle-life of the lithium secondary battery can be acquired. As an example, the carbon may be activated carbon.

With respect to the total amount of the positive electrode active material, the carbon material may be included with 0.1 to 20 wt %, in further detail, with 0.1 to 10 wt %, 1 to 12 wt %, 1 to 10 wt %, 3 to 12 wt %, or 3 to 10 wt %. In this case, the high input output characteristic can be further effectively maintained.

A benzene absorption amount of the carbon material may be 38 to 85 wt %, in further detail, may be 40 to 75 wt %. The absorption amount may be significantly changed depending on an internal pore structure and distribution of the carbon material. When the carbon material having the above-stated range of benzene absorption amount is included in the positive electrode active material, pores that may function as paths or storage for lithium ions have enhanced volumes. Accordingly, a high-rate cycle-life characteristic, an excellent high-rate characteristic, and a storage maintenance characteristic can be acquired.

The positive electrode active material layer may further include a binder and/or a conductive material. The binder attaches the positive electrode active material particles to each other and to the current collector. Examples of the binder include polyvinyl alcohol, carboxymethyl cellulose, hydroxypropylcellulose, diacetyle cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene butadiene rubber, acryl acrylated styrene-butadiene rubber, an epoxy resin, nylon, or the like, but it is not limited thereto.

The conductive material is used to provide conductivity to an electrode, and any suitable electronic conductive material that does not cause a chemical change in a battery can be used. For example, a carbon-based material such as natural graphite, artificial graphite, carbon black, acetylene black, ketjen black, carbon fiber, or the like, a metal powder such as copper, nickel, aluminum, silver, or the like, or a metal-based material such as metal fiber or the like, or one of conductive materials such as a polyphenylene conductor or the like, or a mixture of more than one conductive material may be used.

As for an example current collector, Al may be used, but the present invention is not limited thereto.

For manufacturing each of the positive electrode 1 and the negative electrode 2, the active material, the binder, and the conductive material are mixed in a solvent to manufacture an active material composition, and the composition is coated on the current collector such that the positive electrode 1 and the negative electrode 2 are manufactured. Such a manufacturing method is well known to a person skilled in the art, and therefore no further detailed description will be provided. As for an example solvent, N-methylpyrrolidone may be used, but the present invention is not limited thereto.

The electrolyte includes a non-aqueous organic solvent and lithium salt. The non-aqueous organic solvent functions as a medium through which ions participating in an electrochemical reaction of the battery can move.

Examples of the non-aqueous organic solvent may include a carbonate-based solvent, an ester-based solvent, an ether-based solvent, a ketone-based solvent, an alcohol-based solvent, or an aprotic solvent. Examples of the carbonate-based solvent may include dimethyle carbonate (DMC), diethyle carbonate (DEC), dipropyl carbonate (DPC), methylepropyl carbonate (MPC), ethylepropyl carbonate (EPC), methyethyle carbonate (MEC), ethylene carbonate (EC), propylene carbonate (PC), butylene carbonate (BC), or the like. Examples of the ester-based solvent may include methyl acetate, ethyl acetate, n-propyl acetate, 1,1-dimethylethyl acetate, methyl propionate, ethyle propionate, γ-butyrolactone, decanolide, valerolactone, mevalonolacton, caprolactone, or the like. Examples of the ether-based solvent may include dibutyl ether, tetraglyme, diglyme, dimethoxyethane, 2-methyltetrahydrofuran, tetrahydrofuran, or the like, and cyclohexanone may be used as the ketone-based solvent. In addition, examples of the alcohol-based solvent may include ethyl alcohol, isopropyl alcohol, or the like, and nitriles such as R—CN (R denotes a linear, branched, or ring structured hydrocarbon group of C2 to C20, and may include a double-bonded aromatic ring or an ether bond) or the like, amides such as dimethylformamide or the like, dioxolanes such as 1,3-dioxolane or the like, and sulfolanes may be used as the aprotic solvent.

The non-aqueous organic solvent may be solely used or one or more may be mixed for use. When one or more are mixed, a mixing ratio can be appropriately controlled for a desired battery performance, and this can be readily understood by persons skilled in the art.

In addition, for the carbonate-based solvent, cyclic-type carbonate and chain-type carbonate may be mixed. In this case, the electrolyte solution may have excellent performance if the cyclic-type carbonate and the chain-type carbonate are mixed with a volume ratio of about 1:1 to about 1:9.

The non-aqueous organic solvent may further include an aromatic hydrocarbon-based organic solvent in addition to the carbonate-based solvent. In this case, the carbonate-based solvent and the aromatic hydrocarbon-based organic solvent may be mixed with a volume ratio of about 1:1 to about 30:1.

Examples of the aromatic hydrocarbon-based organic solvent may include benzene, fluoro benzene, 1,2-difluoro benzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzenen, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-tridifluorotoluene, 1,2,4-tridifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triidotolune, 1,2,4-triidotolune, xylene, or a combination thereof.

In order to improve battery cycle-life, the non-aqueous electrolyte may further include vinylene carbonate or ethylene carbonate-based compound. The ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, fluoroethylene carbonate, vinylene ethylene carbonate, or the like. When the vinylene carbonate or the ethylene carbonate is further used, the cycle-life can be improved by appropriately controlling the use amount.

The lithium salt is dissolved in the non-aqueous organic solvent. The dissolved lithium salt enables a basic operation of the lithium-ion rechargeable battery by acting as a supply source of lithium ions in the battery, and accelerates movement of the lithium ions between the positive electrode 1 and the negative electrode 2. The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, LiN ($C_xF_{2x+1}SO_2$, $C_yF_{2y+1}SO_2$, here, x and y are natural numbers), LiCl, LiI, LiB $C_2O_{42}$ (lithium bis(oxalato) borate; LiBOB) or a combination thereof, and they are included as supporting electrolytic soda. The concentration of the lithium salt may be included in a range from 0.1 to 2.0 M. When the concentration of the lithium salt is included in the range, the electrolyte may have a proper conductivity and viscosity so that excellent electrolyte performance can be achieved and lithium ions can be effectively moved.

The separator 3 separates the negative electrode 2 and the positive electrode 1 and provides a movement path for the lithium ions, and any suitable kind of known separator used in the lithium battery may be used. For example, a separator having low resistance and excellent humidification ability with respect to the ion mobility of the electrolyte may be used. For example, the separator 3 may be selected from glass fiber, polyester, Teflon, polyethylene, polypropylene, polytetrafluoroethylene (PTFE), or a combination thereof, and may be a non-woven fabric or a woven fabric. For example, in the lithium ion battery, a polyolefin-based polymer separator such as polyethylene, polypropylene, or the like may be mainly used, a coated separator including a ceramic component or a polymer material (that is included for acquiring heat resistance and mechanical strength) may be used, and a single-layered or multi-layered structure may be selectively used.

Hereinafter, a structure of a lithium-ion battery pack 100 according to an embodiment of the present invention will be described with reference to FIG. 5.

Figure 5:
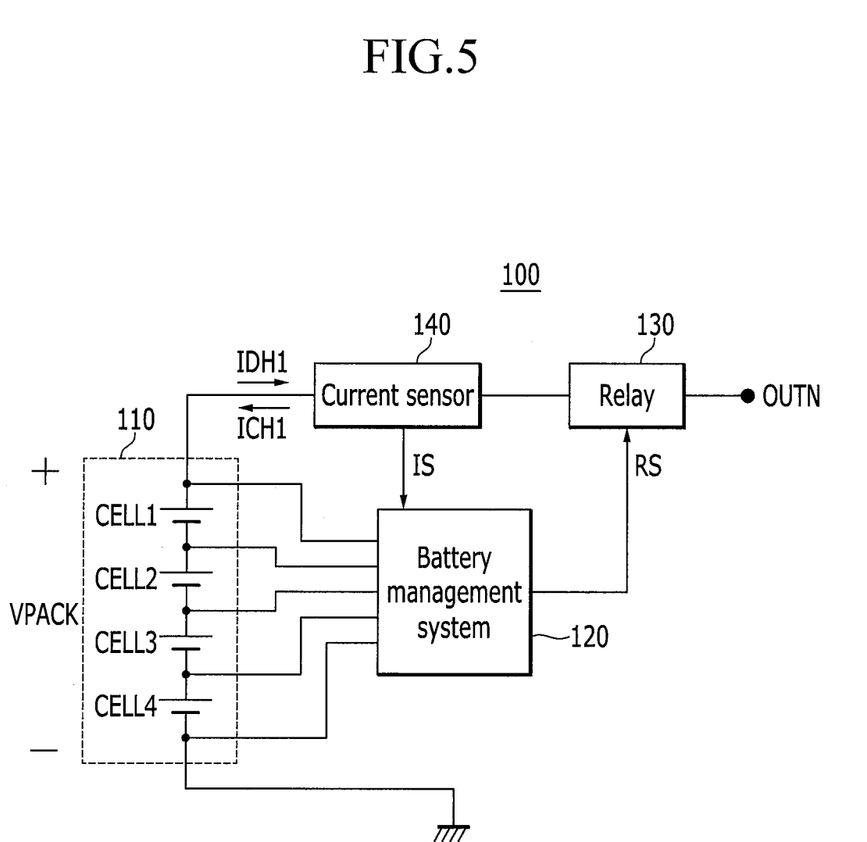
FIG. 5 is a block diagram of a lithium-ion battery pack according to the embodiment of the present invention.

FIG. 5 is a block diagram of the lithium-ion battery pack 100 according to an embodiment of the present invention. As shown in FIG. 5, the lithium-ion battery pack 100 includes a lithium-ion battery 110, a battery management system 120, a relay 130, and a current sensor 140. The lithium-ion battery 110 includes four lithium-ion battery cells CELL1 to CELL4 connected in series. The number of lithium-ion battery cells may be appropriately determined according to a voltage range generated for a vehicle.

The current sensor 140 measures a discharge current IDH1 supplied from the lithium-ion battery 110 and a charging current ICH1 flowing to the lithium-ion battery 110. The current sensor 140 generates current information on the measured current and transmits the current information to the battery management system 120.

The battery management system 120 is connected to a positive electrode and a negative electrode of each of the four lithium-ion battery cells CELL1 to CELL4 to measure a respective plurality of cell voltages VC1 to VC4 and a pack voltage VPACK, receive the current information IS, and measure cell temperatures CT1 to CT4 of the respective lithium-ion battery cells CELL1 to CELL4.

The battery management system 120 controls a cell balancing operation based on the measured cell voltages VC1 to VC4. The battery management system 120 determines whether an over-voltage occurs based on the measured pack voltage VPACK. In addition, the battery management system 120 may calculate the SOC of the lithium-ion battery 110 using the pack voltage VPACK and the current information IS. The battery management system 120 may use at least one of the plurality of cell temperatures CT1 to CT4 for the SOC calculation.

The relay 130 is connected between an output node OUTN and the lithium-ion battery 110. The relay 130 is turned on in a normal state, and when the battery management system 120 senses an abnormal state, the relay 130 is turned off. For example, the abnormal state may include when the pack voltage VPACK is an over-voltage, a specific cell voltage among the cell VC1 to VC4 is an over-voltage or an under-voltage, or at least one of the cell temperatures CT1 to CT4 exceeds a set threshold (such as a predetermined threshold). When sensing the abnormal state, the battery management system 120 transmits a reset signal RS to turn off the relay 130.

Hereinafter, an operation of a multiple battery pack for supplying power to a vehicle will be described with reference to FIG. 6 to FIG. 9.

Figure 6:
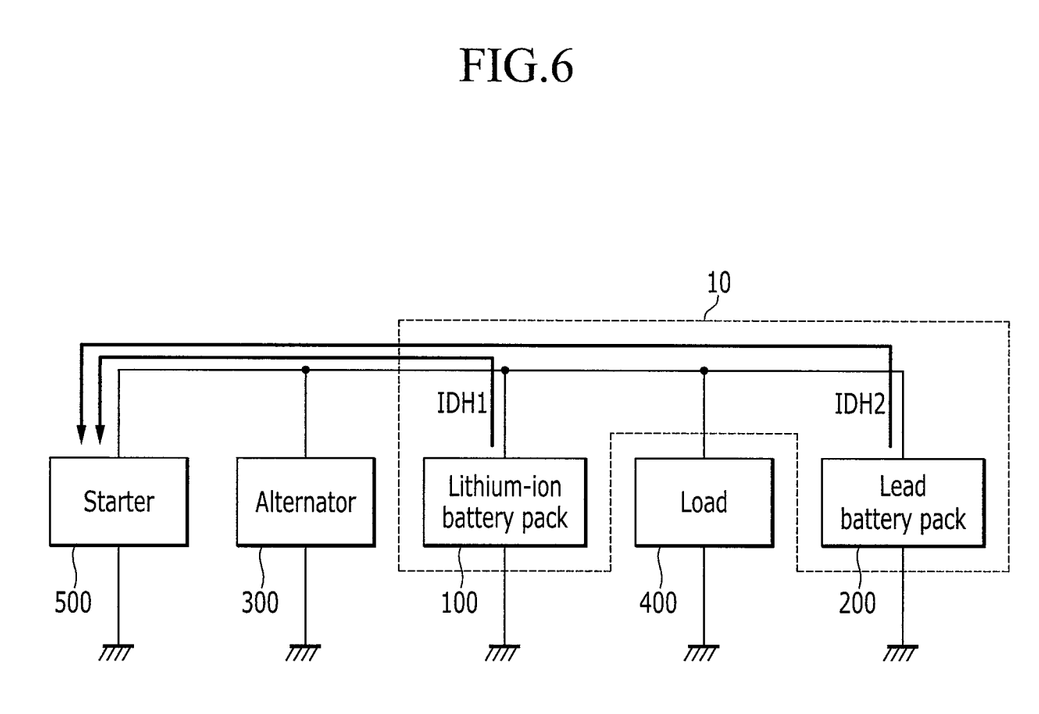
FIG. 6 is a block diagram illustrating a current flow of a multiple battery pack in a cranking operation of a vehicle.

FIG. 6 is a block diagram illustrating a current flow of a multiple battery pack 10 in a cranking operation of the vehicle.

As shown in FIG. 6, current for a cranking operation is supplied from the multiple battery pack 10. In further detail, a discharge current IDH1 and a discharge current IDH2 are respectively supplied from the lithium-ion battery pack 100 and a lead-acid battery pack 200 to a starter 500. The starter 500 receives power for the cranking operation from the lithium-ion battery pack 100 and the lead-acid battery pack 200.

Figure 7:
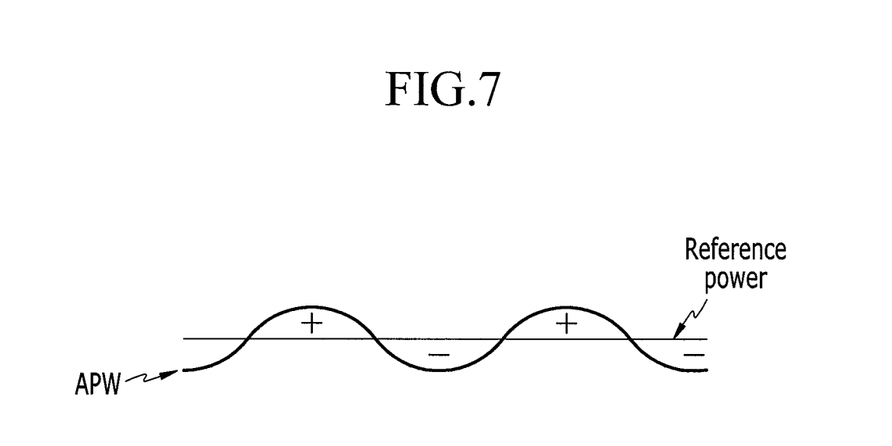
FIG. 7 shows an example of output power of an alternator during driving of a vehicle.

FIG. 7 shows an example of output power of an alternator, generated from a moving vehicle.

As shown in FIG. 7, an output waveform of an alternator 300 fluctuates with reference to a set or predetermined reference power. In FIG. 7, the areas marked (+) are areas where output power APW of the alternator 300 is higher than the reference power, while areas marked (−) are areas where the output power APW of the alternator 300 is lower than the reference power. In the (+) areas, the output power APW of the alternator 300 is supplied to the load 400. The output power APW of the alternator 300, other than the power required for the load 400 (e.g., the excess output power of the alternator 300), is supplied to the multiple battery pack 10 such that the multiple battery pack 10 is charged.

Figure 8:
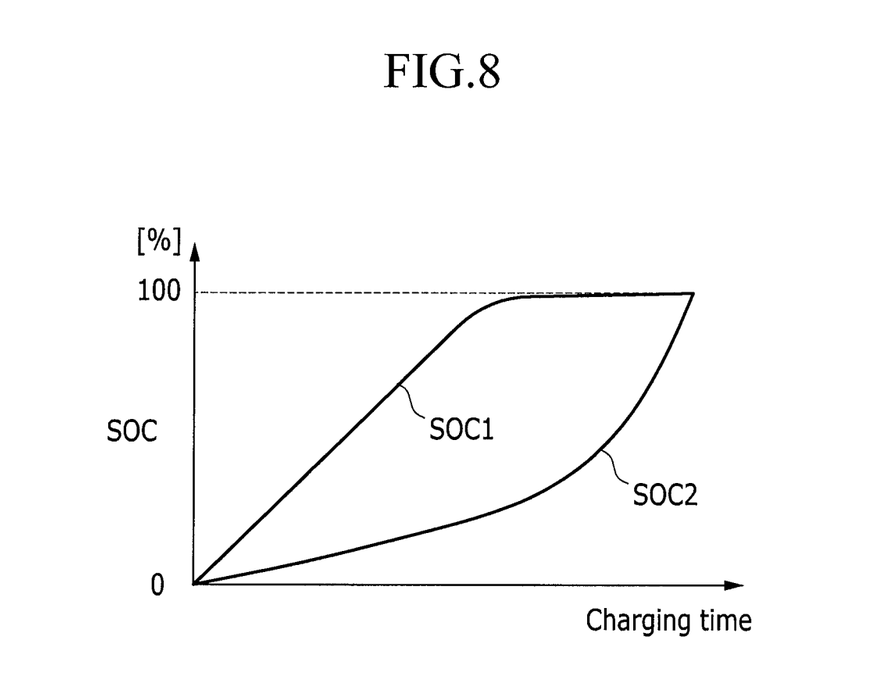
FIG. 8 is a graph illustrating charging characteristics of a lithium-ion battery pack and a lead-acid battery pack according to an embodiment of the present invention.

FIG. 8 is a graph illustrating charging characteristics of the lithium-ion battery pack 100 and the lead-acid battery pack 200 according to an embodiment of the present invention.

FIG. 8 illustrates a charging curve SOC1 of the lithium-ion battery pack 100 and a charging curve SOC2 of the lead-acid battery pack 200 according to the lapse of charging time in the same charging condition. In FIG. 8, the lithium-ion battery pack 100 is an LFP-based lithium-ion battery pack.

The lithium-ion battery pack 100 has a lower capacity when compared to the lead-acid battery pack 200 so that the lithium-ion battery pack 100 can be charged faster than the lead-acid battery pack 200. In addition, a wiring length between the lithium-ion battery pack 100 and the alternator 300 is shorter than a wiring length between the lead-acid battery pack 200 and the alternator 300. Accordingly, the charging speed of the lithium-ion battery pack 100 is faster than that of the lead-acid battery pack 200 due to a difference in wiring resistance. As shown in FIG. 8, a rising slope of the charging curve SOC1 is steeper than a rising slope of the charging curve SOC2.

Referring back to FIG. 7, when the multiple battery pack 10 is charged by the output power APW of the alternator 300, the lithium-ion battery pack 100 is charged first and then the lead-acid battery pack 200 is charged. When the charging by the output power APW is continued after the lithium-ion battery pack 100 is fully charged, a charging operation of the lead-acid battery pack 200 may be continued.

In the (+) areas, the power required for the load 400 is supplied from the multiple battery pack 10. The power is first supplied to the load 400 from the lithium-ion battery pack 100 and then from the lead-acid battery pack 200.

When the vehicle stops moving and parks, power consumption occurs even through no operation occurs in the alternator 300. For example, power may be consumed by a parasitic current or electronic equipment mounted in the vehicle. Here, the electronic equipment is driven even though the vehicle is parked. When the vehicle is parked, the multiple battery pack 10 supplies power to the vehicle.

Figure 9:
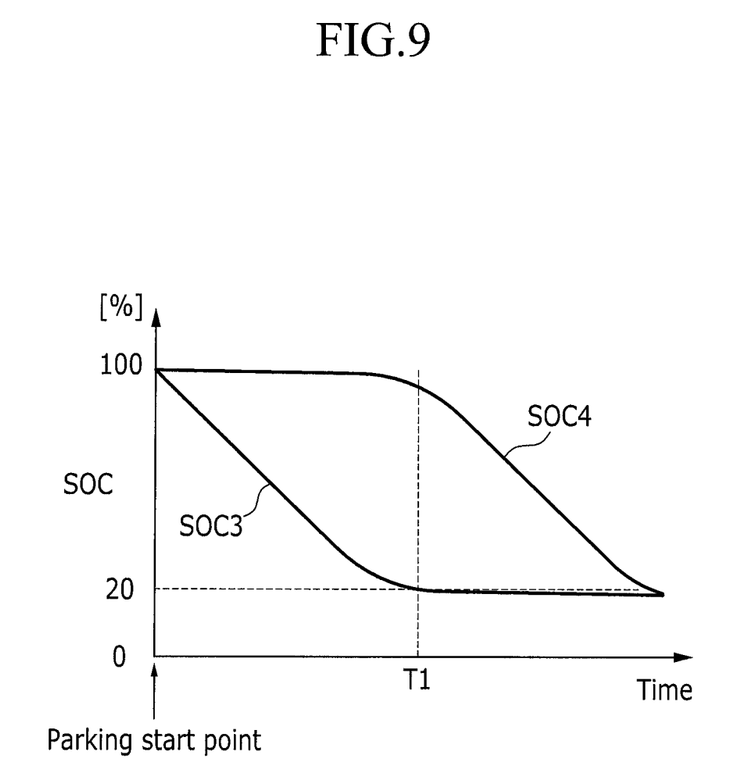
FIG. 9 is a graph illustrating discharging characteristics of the lithium-ion battery pack and the lead-acid battery pack according to an embodiment of the present invention.

FIG. 9 is a graph illustrating discharging characteristics of a lithium-ion battery pack and a lead-acid battery pack according to an embodiment of the present invention.

In FIG. 9, the lithium-ion battery pack 100 and the lead-acid battery pack 200 are fully charged at a parking start time. As shown in FIG. 9, a falling slope of a discharging curve SOC3 of the lithium-ion battery pack 100 is steeper than a falling slope of a discharging curve SOC4 of the lead-acid battery pack 200 from the parking start time. During a period from the parking start time to a time T1 at which the discharging curve SOC3 decreases to SOC 20%, the discharging curve SOC4 only gradually decreases. After the time T1, the falling slope of the discharging curve SOC4 becomes steeper.

That is, power required for the vehicle during the period from the parking start time to the time T1 is supplied from the lithium-ion battery pack 100, while power required for the vehicle after the time T1 is supplied from the lead-acid battery pack 200.

As described, the multiple battery pack 10 can be charged by the alternator 300 and supply power to the load 400 without having additional power conversion members or power control members. This is because the capacity of the lithium-ion battery pack 100 is lower than that of the lead-acid battery pack 200, and because a current path between the lithium-ion battery pack 100 and the alternator 300 is shorter than a current path between lead-acid battery pack 200 and the alternator 300.

Further, the above-stated effects also can be provided from material properties of the positive electrode and the negative electrode of the lithium-ion battery cell.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SOME SYMBOLS

1: positive electrode
2: negative electrode
3: separator
4: electrode assembly
10: multiple battery pack
100: lithium-ion battery pack
200: lead-acid battery pack
300: alternator
400: load
500: starter
CELL1-CELL4: lithium-ion battery cells
110: lithium-ion battery
120: battery management system
130: relay
140: current sensor

What is claimed is:

1. A lithium battery system comprising:
a first battery pack comprising a plurality of first battery cells connected in series, the first battery pack being configured to be connected in parallel to an alternator and a second battery pack, and having a lower capacity than the second battery pack,
wherein a negative electrode of each of the first battery cells comprises a negative electrode active material, and the negative electrode active material comprises a carbon-based material having an interlayer spacing of a (002) plane of 0.34 nm to 0.50 nm in X-ray diffraction measurement using copper (Cu) Kα lines; and wherein a current path between the first battery pack and the alternator is shorter than a current path between the second battery pack and the alternator, and wherein an operation voltage range of each of the first battery cells comprises an enhanced voltage range below 2V for cranking of a vehicle at a cold temperature.

2. The lithium battery system of claim 1, wherein the carbon-based material is soft carbon, hard carbon, mesophase pitch-based carbide, calcined cokes, or a combination thereof.

3. The lithium battery system of claim 1, wherein an average diameter of the carbon-based material is 1 μm to 50 μm.

4. The lithium battery system of claim 1, wherein each of the first battery cells comprises a positive electrode, the positive electrode comprises a positive electrode active material, and the positive electrode active material comprises a lithium-nickel-based oxide, a lithium-cobalt-based oxide, a lithium-nickel-manganese-based oxide, a lithium-nickel-cobalt-manganese-based oxide, a lithium-nickel-cobalt-aluminum-based oxide, a lithium-phosphate-based oxide, or a combination thereof.

5. The lithium battery system of claim 4, wherein the positive electrode active material further comprises a carbon material having a surface area of 500 $m^2/g$ to 2500 $m^2/g$.

6. The lithium battery system of claim 1, wherein each of the first battery cells is a lithium-ion cell, and a positive electrode of each of the first battery cells comprises a nickel-based positive electrode active material.

7. The lithium battery system of claim 6, wherein an operation voltage range of each of the first battery cells comprises:
a first enhanced range including 1.5 V to 2.0 V;
a first normal range including 2.0 V to 4.2 V; and
a first over-charging range including 4.2 V to 4.5 V.

8. The lithium battery system of claim 1, wherein each of the first battery cells is a lithium-ion battery cell, and a positive electrode of each of the first battery cells comprises a lithium-iron-phosphate-based positive electrode active material.

9. The lithium battery system of claim 8, wherein an operation voltage range of each of the first battery cells comprises:
a second normal range including 1.75 V to 3.8 V; and
a second over-charging range including 3.8 V to 4.5 V.

10. The lithium battery system of claim 1, wherein a current path between the first battery pack and the alternator is shorter than a current path between the second battery pack and the alternator.

11. The lithium battery system of claim 1, wherein internal resistance of the first battery pack is lower than internal resistance of the second battery pack.

12. A vehicle battery system comprising:
an alternator configured to generate power to the vehicle battery system;
a first battery pack connected in parallel with the alternator and including a plurality of first battery cells connected in series; and
a second battery pack connected with the alternator and the first battery pack in parallel, and having a capacity greater than that of the first battery pack, wherein a negative electrode of each of the first battery cells comprises a negative electrode active material, and the negative electrode active material comprises a carbon-based material having an interlayer spacing of a (002) plane of 0.34 nm to 0.50 nm in X-ray diffraction measurement using copper (Cu) Kα lines; and wherein a current path between the first battery pack and the alternator is shorter than a current path between the second battery pack and the alternator, and wherein an operation voltage range of each of the first battery cells comprises an enhanced voltage range below 2V for cranking of a vehicle at a cold temperature.

13. The vehicle battery system of claim 12, wherein the second battery pack is a lead-acid battery pack.

14. The vehicle battery system of claim 12, wherein internal resistance of the first battery pack is lower than internal resistance of the second battery pack.

15. An operation method of a vehicle battery system having a multiple battery pack that is coupled in parallel with an alternator, a starter, and a load of a vehicle, the method comprising:
supplying power to the starter from the multiple battery pack during a cranking operation of the vehicle;
supplying power to the load from one of the alternator or the multiple battery pack when the vehicle is being driven; and
supplying power to the vehicle from the multiple battery pack when the vehicle is parked,
wherein the multiple battery pack comprises a first battery pack and a second battery pack;
wherein a current path between the first battery pack and the alternator is shorter than a current path between the second battery pack and the alternator; and
wherein the first battery pack comprises a plurality of first battery cells connected in series, a negative electrode of each of the first battery cells comprises a negative electrode active material, and the negative electrode active material comprises a carbon-based material having an interlayer spacing of a (002) plane of 0.34 nm to 0.50 nm in X-ray diffraction measurement using copper (Cu) Kα lines, and
wherein an operation voltage range of each of the first battery cells comprises an enhanced voltage range below 2V for the cranking operation of the vehicle at a cold temperature.

16. The operation method of the vehicle battery system of claim 15, wherein the supplying of the power to the load when the vehicle is being driven comprises:
supplying output power of the alternator to the load when the output power of the alternator is higher than a reference power; and
supplying power from the multiple battery pack to the load when the output power of the alternator is lower than the reference power.

17. The operation method of the vehicle battery system of claim 15, further comprising charging the multiple battery pack with excess power from the alternator when output power of the alternator is higher than a reference power.

18. The operation method of the vehicle battery system of claim 17, wherein when the multiple battery pack is being charged with the excess power from the alternator, a charging speed of the first battery pack is faster than a charging speed of the second battery pack.

19. The operation method of the vehicle battery system of claim 15, wherein when the multiple battery pack is supplying the power to the vehicle when the vehicle is parked, a discharging speed of the first battery pack is faster than a discharging speed of the second battery pack.

* * * * *